(12) United States Patent
Livshiz et al.

(10) Patent No.: US 6,895,946 B1
(45) Date of Patent: May 24, 2005

(54) TORQUE CONTROL OF SUPERCHARGED ENGINE

(75) Inventors: Michael Livshiz, Ann Arbor, MI (US); Scott J. Chynoweth, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/953,954

(22) Filed: Sep. 29, 2004

(51) Int. Cl.[7] .............................................. F02B 33/00
(52) U.S. Cl. .................................. 123/559.1; 123/434
(58) Field of Search ........................... 123/559.1, 434, 123/344, 350, 361, 376

(56) References Cited

U.S. PATENT DOCUMENTS 5,069,184 A * 12/1991 Kato et al. ............. 123/406.46
6,704,638 B2    3/2004 Livshiz et al.

\* cited by examiner

*Primary Examiner*—Bibhu Mohanty
(74) *Attorney, Agent, or Firm*—Christopher DeVries

(57) ABSTRACT

An engine system includes an engine having an intake manifold and a supercharger that supplies compressed air to the intake manifold. An engine control module calculates a desired pre-supercharged pressure of air into the supercharger and calculates a desired manifold air flow into the engine. The engine control module determines a desired throttle area based on the desired pre-supercharged pressure and the desired manifold air flow and generates control signals to control the engine based on the desired throttle area.

32 Claims, 3 Drawing Sheets

TORQUE CONTROL OF SUPERCHARGED ENGINE

FIELD OF THE INVENTION

The present invention relates to engines, and more particularly to torque control of a supercharged engine.

BACKGROUND OF THE INVENTION

Internal combustion engines combust an air and fuel mixture within cylinders to drive pistons, which produces drive torque. Air flow into the engine is regulated via a throttle. More specifically, the throttle adjusts a throttle area, which increases or decreases air flow into the engine. As the throttle area increases, the air flow into the engine increases. A fuel control system adjusts a fuel injection system to provide a desired air/fuel mixture to the cylinders. As can be appreciated, increasing the air and fuel to the cylinders increases the torque output of the engine. Some engines include a supercharger that compresses air flowing into the engine. The supercharger is driven by the engine. Since more air and fuel can be supplied to the cylinders, more torque is produced.

Engine control systems have been developed to accurately control engine torque output to achieve a desired torque. Traditional engine control systems, however, do not control the engine torque output as accurately as desired. Further, traditional engine control systems do not provide as rapid of a response to control signals as is desired.

SUMMARY OF THE INVENTION

Accordingly, the present invention provides an engine system including an engine having an intake manifold and a supercharger that supplies compressed air to the intake manifold. An engine control module calculates a desired pre-supercharged pressure of air into the supercharger and calculates a desired manifold air flow into the engine. The engine control module determines a desired throttle area based on the desired pre-supercharged pressure and the desired manifold air flow and generates control signals to control the engine based on the desired throttle area.

In one feature, the engine control module determines a desired manifold absolute pressure. The desired pre-supercharged pressure is calculated based on the desired manifold absolute pressure.

In another feature, the engine system further includes a first sensor that generates a first signal based on a pre-supercharged pressure of air within the supercharger and a second sensor that generates a second signal based on a manifold absolute pressure. The desired pre-supercharged pressure is determined based on the first signal and the second signal.

In other features, the engine control module calculates a desired air-per-cylinder and the desired manifold air flow is based on the desired air-per-cylinder. The engine control module determines an air-per-cylinder correction and corrects the desired air-per-cylinder based on the air-per-cylinder correction. The engine control module calculates a torque estimate and the air-per-cylinder correction is based on the torque estimate.

In still other features, the engine system further includes a bypass valve that is regulated based on a bypass schedule to control a flow of supercharged air from the supercharger to the engine. The bypass schedule is determined based on a desired manifold absolute pressure and a desired air-per-cylinder.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
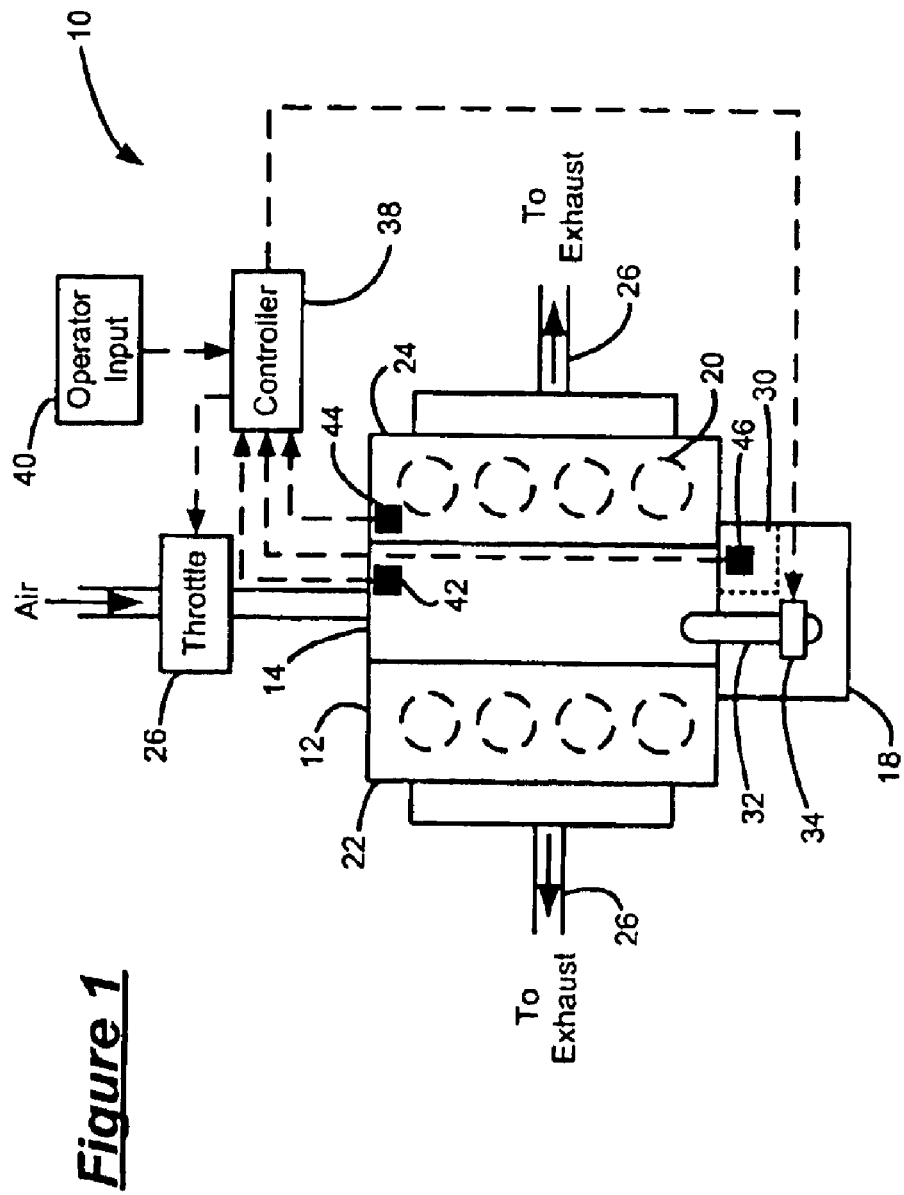
FIG. 1 is a schematic illustration of an exemplary engine system including a supercharger according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary engine system 10 is schematically illustrated in accordance with the present invention. The engine system 10 includes an engine 12, an intake manifold 14 and a supercharger 18. The exemplary engine 12 includes eight cylinders 20 configured in adjacent cylinder banks 22,24 in V-type layout. Although FIG. 1 depicts eight cylinders (N=8), it can be appreciated that the engine 12 may include additional or fewer cylinders 20. For example, engines having 2, 4, 5, 6, 10, 12 and 16 cylinders are contemplated. It is also anticipated that the engine 12 can have an inline-type cylinder configuration.

Air is drawn into the intake manifold 14 through a throttle 26 by the inlet vacuum created by the engine intake stroke. Air is drawn into the individual cylinders 20 from the intake manifold 14 and is compressed therein. Fuel is injected by an injection system (not shown) and is mixed with air. The piston (not shown) compresses the air/fuel mixture and the heat of compression and/or an electrical ignition ignites the air/fuel mixture. Exhaust gas is exhausted from the cylinders 20 through exhaust conduits 28.

The supercharger 18 is driven by the engine 12 and compresses air drawn in from the intake manifold 14. More particularly, air is drawn into an intermediate chamber 30 of the supercharger 18. The air in the intermediate chamber 30 is drawn into a compressor (not shown) and is compressed therein. The compressed air flows back to the intake manifold 14 through a conduit 32 for combustion in the cylinders 20. A bypass valve 34 is disposed within the conduit and regulates the flow of compressed air back into the intake manifold 14.

A control module 38 controls overall operation of the engine system 10 based on various operating parameters and the engine torque control system of the present invention. An operator input 40 generates a control signal that is communicated to the control module 38. The operator input 40 includes, but is not limited to, an accelerator, a brake and/or a cruise control system. The control signal either indicates the operator's desired engine torque output (i.e., in the case of an accelerator) or is used to determine a desired engine torque output (i.e., in the case of a cruise control system).

A manifold absolute pressure (MAP) sensor 42 generates a MAP signal that is communicated to the control module 38. An engine speed sensor 44 generates an engine speed (RPM) signal that is communicated to the control module 38. A pre-supercharge pressure (PSCP) sensor 46 monitors a pressure of the non-compressed air within the intermediate chamber 30 of the supercharger 18. The control module 38 processes a torque request ($T_{REQ}$), the various signals and other parameters discussed herein based on the engine torque control of the present invention to determine a throttle area ($A_{THR}$) and a bypass schedule ($B_{SCHED}$). The engine 12 is operated based on $A_{THR}$ and $B_{SCHED}$ to achieve $T_{REQ}$. More specifically, $A_{THR}$ regulates the amount of air flowing into the engine 12 through the throttle 26. The bypass valve 34 is controlled based on $B_{SCHED}$ to regulate the amount of compressed air into the engine 12 from the supercharger 18.

$A_{THR}$ is determined based on a desired manifold air flow ($MAF_{DES}$) and a desired PSCP ($PSCP_{DES}$). $MAF_{DES}$ is determined based on a desired air-per-cylinder ($APC_{DES}$). $PSCP_{DES}$ is determined based on a desired MAP ($MAP_{DES}$), PSCP and MAP and is characterized by the following equation:

$$PSCP_{DES} = MAP_{DES} \cdot f(MAP, PSCP, RPM)$$

The calculation of $MAF_{DES}$, $APC_{DES}$ and $MAP_{DES}$ is discussed in further detail in commonly assigned U.S. patent application Ser. No. 10/664,172, filed Sep. 17, 2003, the disclosure of which is expressly incorporated herein by reference. By determining $A_{THR}$ based on $PSCP_{DES}$, the engine torque control system of the present invention enables a quicker transient response over traditional torque control systems.

Figure 2:
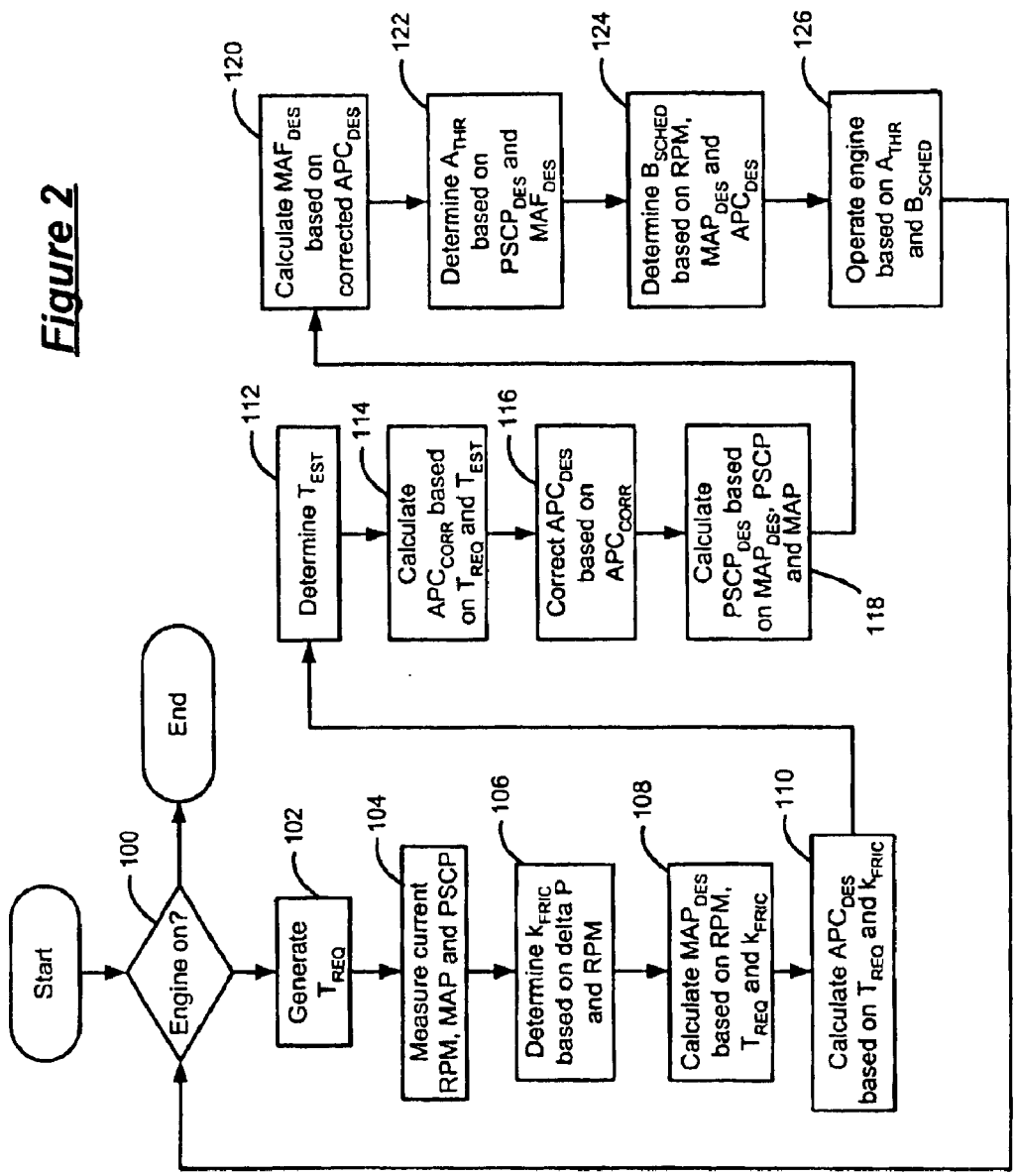
FIG. 2 is a flowchart illustrating the engine torque control system of the present invention.

Referring now to FIG. 2, the engine torque control system will be discussed in further detail. In step 100, control determines whether the engine 12 is running. If the engine 12 is not running, control ends. If the engine 12 is running, control generates $T_{REQ}$ based on the operator input 40 in step 102. In step 104, control measures the current RPM, MAP and PSCP. Control determines a supercharger friction factor ($k_{FRIC}$) based on $\Delta P$ and RPM in step 106. $\Delta P$ is calculated as the difference between MAP and PSCP. $k_{FRIC}$ can be determined from a look-up table based on $\Delta P$ and RPM. In step 108, control calculates $MAP_{DES}$ based on RPM, $T_{REQ}$ and $k_{FRIC}$. Control calculates $APC_{DES}$ based on $T_{REQ}$ and $k_{FRIC}$ in step 110.

In step 112, control determines a torque estimate ($T_{EST}$). $T_{EST}$ is determined based on RPM, spark and a dilution estimate using a steady-state torque estimator, as discussed in detail in commonly assigned U.S. Pat. No. 6,704,638, issued Mar. 9, 2004, the disclosure of which is expressly incorporated herein by reference. In step 114, control calculates an air-per-cylinder correction ($APC_{CORR}$) based on $T_{REQ}$ and $T_{EST}$. Control corrects $APC_{DES}$ based on $APC_{CORR}$ in step 116. In step 118, control calculates $PSCP_{DES}$ based on $MAP_{DES}$, PSCP and MAP.

In step 120, control calculates $MAF_{DES}$ based on the corrected $APC_{DES}$. $A_{THR}$ is determined based on $PSCP_{DES}$ and $MAF_{DES}$ in step 122. In step 124, control determines $B_{SCHED}$ based on RPM, $MAP_{DES}$ and $APC_{DES}$. More particularly, $B_{SCHED}$ is determined from a look-up table based on RPM, $MAP_{DES}$ and $APC_{DES}$. Control operates the engine based on $A_{THR}$ and $B_{SCHED}$ in step 126 and loops back to step 100.

Figure 3:
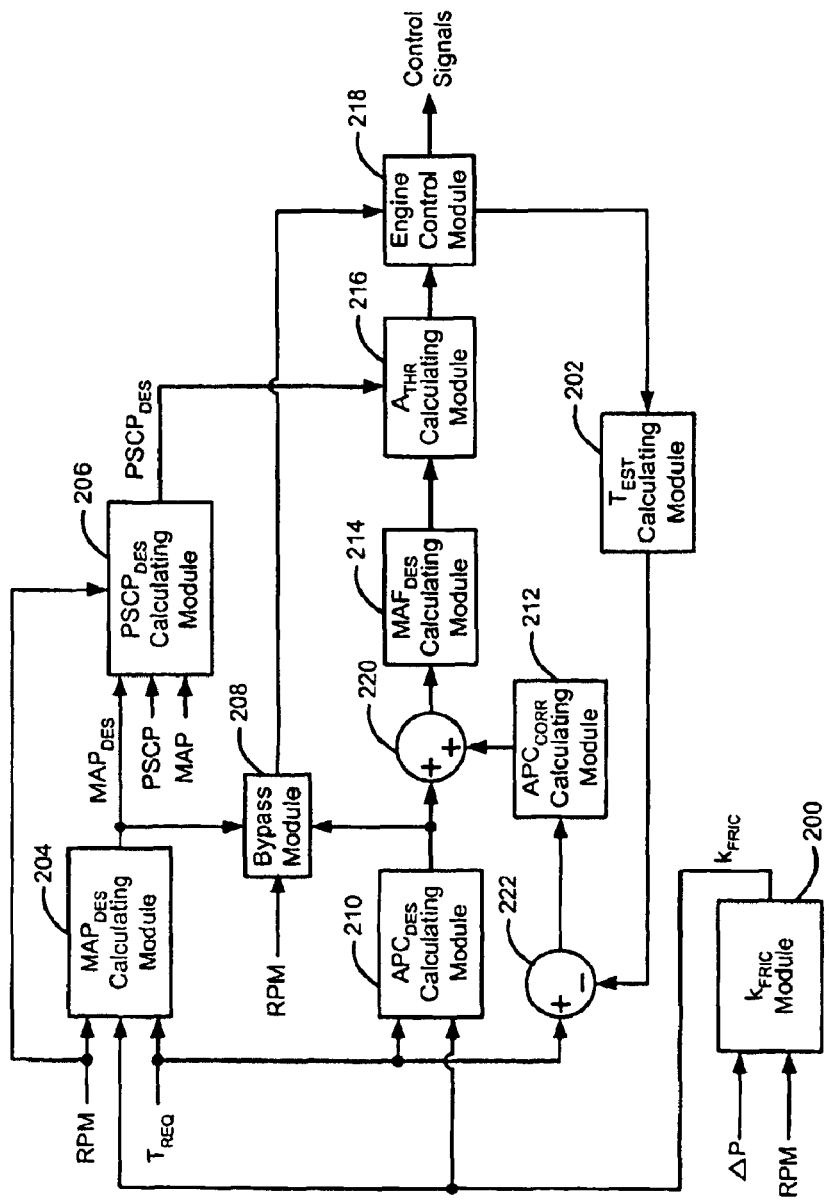
FIG. 3 is a block diagram illustrating modules that execute the engine torque control of the present invention.

Referring now to FIG. 3, exemplary modules will be discussed, which execute the engine torque control system of the present invention. The modules include a $k_{FRIC}$ module 200, a $T_{EST}$ calculating module 202, a $MAP_{DES}$ calculating module 204, a $PSCP_{DES}$ calculating module 206, a bypass module 208, an $APC_{DES}$ calculating module 210, an $APC_{CORR}$ calculating module 212, a $MAF_{DES}$ calculating module 214, an $A_{THR}$ calculating module 216 and an engine control module 218.

The $k_{FRIC}$ 200 module determines $k_{FRIC}$ using a look-up table based on $\Delta P$ and RPM. Alternatively, it is anticipated that $k_{FRIC}$ can be calculated using a mathematical equation based on $\Delta P$ and RPM. $k_{FRIC}$ is provided to the $MAP_{DES}$ calculating module 204 and the $APC_{DES}$ calculating module 210. The $MAP_{DES}$ calculating module 204 calculates $MAP_{DES}$ based on RPM, $k_{FRIC}$ and $T_{REQ}$. $MAP_{DES}$ is provided to the $PSCP_{DES}$ calculating module 206 and the bypass module 208. The $APC_{DES}$ calculating module 206 calculates $APC_{DES}$ based on $T_{REQ}$ and $k_{FRIC}$. $APC_{DES}$ is provided to the bypass module 208 and a summer 220. The bypass module 208 determines $B_{SCHED}$ from a look-up table based on RPM, $MAP_{DES}$ and $APC_{DES}$. Alternatively, it is anticipated that $B_{SCHED}$ can be calculated using a mathematical equation based on $MAP_{DES}$ and $APC_{DES}$.

The $T_{EST}$ calculating module 202 calculates $T_{EST}$ and provides $T_{EST}$ to a summer 222. The summer 222 provides a difference between $T_{REQ}$ and $T_{EST}$, which is provided to the $APC_{CORR}$ calculating module 212. $APC_{CORR}$ is calculated by the $APC_{CORR}$ calculating module 212 and is provided to the summer 220. The summer 220 provides the corrected $APC_{DES}$ based on the sum of $APC_{DES}$ and $APC_{CORR}$ and provides the corrected $APC_{DES}$ to the $MAF_{DES}$ calculating module 214. The $MAF_{DES}$ calculating module 214 calculates $MAF_{DES}$ and provides $MAF_{DES}$ to the $A_{THR}$ calculating module 216. The $PSCP_{DES}$ calculating module 206 calculates $PSCP_{DES}$ based on $MAP_{DES}$, PSCP and MAP and provides $PSCP_{DES}$ to the $A_{THR}$ calculating module 216. $A_{THR}$ and $B_{SCHED}$ are provided to the engine control module 218, which generates control signals based thereon. One control signal actuates the throttle to achieve $A_{THR}$. Another control signal actuates the bypass valve to achieve $B_{SCHED}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine system, comprising:
   an engine having an intake manifold;
   a supercharger that supplies compressed air to said intake manifold; and
   a first module that calculates a desired pre-supercharged pressure of air into said supercharger;
   a second module that calculates a desired manifold air flow into said engine;
   a third module that determines a desired throttle area based on said desired pre-supercharged pressure and said desired manifold air flow; and
   a fourth module that generates control signals to control said engine based on said desired throttle area.

2. The engine system of claim 1 further comprising a fifth module that determines a desired manifold absolute pressure, wherein said desired pre-supercharged pressure is calculated based on said desired manifold absolute pressure.

3. The engine system of claim 1 further comprising:
   a first sensor that generates a first signal based on a pre-supercharged pressure of air within said supercharger;

a second sensor that generates a second signal based on a manifold absolute pressure; and wherein said desired pre-supercharged pressure is determined based on said first signal and said second signal.

4. The engine system of claim 1 further comprising a fifth module that calculates a desired air-per-cylinder and said desired manifold air flow is based on said desired air-per-cylinder.

5. The engine system of claim 4 further comprising a sixth module that determines an air-per-cylinder correction and corrects said desired air-per-cylinder based on said air-per-cylinder correction.

6. The engine system of claim 5 further comprising a seventh module that calculates a torque estimate and said air-per-cylinder correction is based on said torque estimate.

7. The engine system of claim 1 further comprising a bypass valve that is regulated based on a bypass schedule to control a flow of supercharged air from said supercharger lo said engine.

8. The engine system of claim 7 wherein said bypass schedule is determined based on a desired manifold absolute pressure and a desired air-per-cylinder.

9. A method of controlling a torque output of an engine having a supercharger, comprising:

calculating a desired pre-supercharged pressure of air into said supercharger;

calculating a desired manifold air flow into said engine;

determining a desired throttle area based on said desired pre-supercharged pressure and said desired manifold air flow; and controlling said engine based on said desired throttle area.

10. The method of claim 9 further comprising determining a desired manifold absolute pressure, wherein said desired pre-supercharged pressure is calculated based on said desired manifold absolute pressure.

11. The method of claim 10 wherein said desired pre-supercharged pressure is further determined based on a pre-supercharged pressure and a manifold absolute pressure.

12. The method of claim 9 further comprising calculating a desired air-per-cylinder, wherein said desired manifold air flow is based on said desired air-per-cylinder.

13. The method of claim 12 further comprising:

determining an air-per-cylinder correction; and correcting said desired air-per-cylinder based on said air-per-cylinder correction.

14. The method of claim 13 further comprising calculating a torque estimate, wherein said air-per-cylinder correction is based on said torque estimate.

15. The method of claim 9 further comprising:

determining a bypass schedule; and controlling a bypass valve of said engine based on said bypass schedule to regulate a supercharged air flow into said engine.

16. The method of claim 15 wherein said bypass schedule is determined based on a desired manifold absolute pressure and a desired air-per-cylinder.

17. The method of claim 9 further comprising determining a supercharger friction factor based on a pressure differential and an engine speed, wherein said desired throttle area is further based on said friction factor.

18. A method of controlling a torque output of an engine having a supercharger, comprising:

calculating a desired pre-supercharged pressure of air into said supercharger;

calculating a desired manifold air flow into said engine;

determining a desired throttle area based on said desired pre-supercharged pressure and said desired manifold air flow;

regulating a bypass valve of said engine based on a bypass schedule to regulate a supercharged air flow into said engine; and controlling said engine based on said desired throttle area.

19. The method of claim 18 further comprising determining a desired manifold absolute pressure, wherein said desired pre-supercharged pressure is calculated based on said desired manifold absolute pressure.

20. The method of claim 19 wherein said desired pre-supercharged pressure is further determined based on a pre-supercharged pressure and a manifold absolute pressure.

21. The method of claim 18 further comprising calculating a desired air-per-cylinder, wherein said desired manifold air flow is based on said desired air-per-cylinder.

22. The method of claim 21 further comprising:

determining an air-per-cylinder correction; and correcting said desired air-per-cylinder based on said air-per-cylinder correction.

23. The method of claim 22 further comprising calculating a torque estimate, wherein said air-per-cylinder correction is based on said torque estimate.

24. The method of claim 18 further comprising determining said bypass schedule based on a desired manifold absolute pressure and a desired air-per-cylinder.

25. An engine system, comprising:

an engine having an intake manifold;

a supercharger that supplies compressed air to said intake manifold; and an engine control module that calculates a desired pre-supercharged pressure of air into said supercharger, that calculates a desired manifold air flow into said engine, that determines a desired throttle area based on said desired pre-supercharged pressure and said desired manifold air flow and that generates control signals to control said engine based on said desired throttle area.

26. The engine system of claim 25 wherein said engine control module determines a desired manifold absolute pressure, wherein said desired pre-supercharged pressure is calculated based on said desired manifold absolute pressure.

27. The engine system of claim 25 further comprising:

a first sensor that generates a first signal based on a pre-supercharged pressure of air within said supercharger;

a second sensor that generates a second signal based on a manifold absolute pressure; and wherein said desired pre-supercharged pressure is determined based on said first signal and said second signal.

28. The engine system of claim 25 wherein said engine control module calculates a desired air-per-cylinder and said desired manifold air flow is based on said desired air-per-cylinder.

29. The engine system of claim 28 wherein said engine control module determines an air-per-cylinder correction and corrects said desired air-per-cylinder based on said air-per-cylinder correction.

30. The engine system of claim 29 wherein said engine control module calculates a torque estimate and said air-per-cylinder correction is based on said torque estimate.

31. The engine system of claim 25 further comprising a bypass valve that is regulated based on a bypass schedule to control a flow of supercharged air from said supercharger to said engine.

32. The engine system of claim 31 wherein said bypass schedule is determined based on a desired manifold absolute pressure and a desired air-per-cylinder.

* * * * *